(12) United States Patent
Wolf et al.

(10) Patent No.: US 6,318,708 B1
(45) Date of Patent: Nov. 20, 2001

(54) RUBBER RADIAL BEARING

(75) Inventors: Franz J. Wolf, Bad Soden-Salmunster; Peter Koczar, Wachtersbach; Christian Fiedler, Brachttal, all of (DE)

(73) Assignee: Woco Franz-Josef Wolf & Co., Bad Soden-Salmunster (DE)

( * ) Notice: Subject to any disclaimer, the term of this patent is extended or adjusted under 35 U.S.C. 154(b) by 0 days.

(21) Appl. No.: 09/269,272

(22) PCT Filed: Jul. 24, 1998

(86) PCT No.: PCT/EP98/04643

§ 371 Date: Aug. 2, 1999

§ 102(e) Date: Aug. 2, 1999

(87) PCT Pub. No.: WO99/05429

PCT Pub. Date: Feb. 4, 1999

(30) Foreign Application Priority Data

Jul. 25, 1997 (DE) .............................................. 197 32 123

(51) Int. Cl.[7] ...................................................... F16F 5/00
(52) U.S. Cl. ...................................................... 267/140.12
(58) Field of Search .......................... 267/140.12, 140.11, 267/140.13, 219; 248/562, 636

(56) References Cited

U.S. PATENT DOCUMENTS 4,768,760 * 9/1988 Le Fol ............................ 267/140.12
4,896,868 * 1/1990 Thelamon et al. ............... 267/140.12
5,035,407 * 7/1991 Takeguchi et al. ................... 267/219
5,054,752    10/1991 Tabata .............................. 267/140.12
5,058,866 * 10/1991 Hamaekers et al. .................. 267/219
5,118,087 * 6/1992 Jordens et al. .................. 267/140.12
5,246,211 * 9/1993 Klein et al. ..................... 267/140.13
5,286,011    2/1994 Strand ............................. 261/140.12
5,516,083 * 5/1996 Sprang et al. .................. 267/140.12

FOREIGN PATENT DOCUMENTS 39 20 153      12/1989  (DE) .
195 03 445     8/1996   (DE) .
0 335 007  *  12/1988  (EP) .
3 326 472      8/1989   (EP) .
0 415 001      3/1991   (EP) .
0 418 671      3/1991   (EP) .
0 645 556      3/1995   (EP) .

* cited by examiner

*Primary Examiner*—Robert J. Oberleitner
*Assistant Examiner*—Thomas J. Williams
(74) *Attorney, Agent, or Firm*—Lowe Hauptman Gilman & Berner

(57) ABSTRACT

In a sleevelike hydraulically damping rubber bearing with at least two hydraulic working chambers, at least one throttle duct for the damping of vibrations of low amplitudes and one bypass duct for opening the bearing for shock amplitudes are provided. In order to improve the impermeability of the bearing to low disturbing noises, the natural resonance, typically located in the subacoustic range for such bearings, can be shifted into a frequency range around 200 Hz by the insertion of an uncoupling element.

6 Claims, 3 Drawing Sheets

RUBBER RADIAL BEARING

The invention relates to a hydraulically damping sleeve-like rubber bearing.

The invention accordingly relates, in particular therefore, to a hydraulically damping sleevelike rubber bearing, especially radial rubber bearing, with different spring characteristics (F1, F2) radially perpendicular to one another. The bearing consists of an inner sleevelike connecting block (1) and of a likewise sleevelike cage (2) surrounding the latter, said block and said cage, lying axially parallel one in the other, being vulcanized or otherwise embedded in a rubber spring block (3). At least two diametrically opposed pumping working chambers (4, 5) for a working fluid, communicating with one another via at least two overflow ducts (6; 21), are designed in the rubber spring block (3) in such a way that said working chambers are closed off in a fluid-tight manner, radially relative to the outside, by the cylindrical inner wall (7) of an outer sleeve (8), for which purpose the rubber spring block (3), reinforced by the cage, is pressed under radial prestress into the outer sleeve (8). The at least two overflow ducts have permeability behaviors and damping behaviors which are different from one another and are in each case tuned to different amplitude ranges.

Such a sleeve bearing is known from European preliminary publication EP 0 335 007 A2. It has a throttle duct of small cross section for damping of vibrations of relatively low amplitudes, particularly of the order of magnitude of ±0.1 mm in the acoustic frequency range of approximately 40 to 200 Hz, and a second overflow duct of larger cross section, which acts as a bypass duct for this throttle duct, in which a rubber lip is provided as a bypass valve. When excessively high amplitudes (>±2 mm) act on the bearing, that is to say when a pressure gradient, increased beyond the intended operating characteristic data foreseeable for the respective use of the bearing, occurs in one of the two fluid chambers, the rubber lip opens and allows damping fluid to overflow from one chamber to the other in each case, the pressure gradient at the same time being compensated, and, if appropriate, with slight damping.

The phenomena mentioned, which act with excessively high amplitudes on the bearing, are, particularly in the field of motor vehicle technology, as a rule, either stochastic shocks and impacts or low frequency vibration-like phenomena of high amplitude, occur, for example, in the motor vehicle when it travels over undulating roads of long wavelength and, as a rule, are at frequencies of below 10 Hz, that is to say at frequencies well into the subacoustic range.

So that the forces which occur during these dynamic spring loads, and which are sometimes very considerable, can be absorbed both in conformity with the appropriate function and with as much care as possible being taken of the material of the rubber spring, bearings of this type are conventionally tuned in such a way that their fundamental resonance is placed in the range between 10 and 30 Hz, that is to say in the range between the markedly subacoustic frequencies and the lowest acoustic frequencies. For this purpose, however, it is necessary, in the case of bearings of this type, to allow for the fact that, after the resonance maximum, the dynamic spring constant of the bearing scarcely decreases appreciably toward higher frequencies. However, the higher the dynamic bearing spring constant remaining after the resonance maximum, the more permeable the bearing becomes to a passage of subsequent frequencies in the acoustic range, so that disturbing acoustic vibrations, taking the form of only insufficiently damped or even virtually undamped solidborne sound, pass through from the supporting connection to the abutment connection, that is to say from the inner sleeve to the outer sleeve or, conversely, from the outer sleeve to the inner sleeve of the rubber sleeve bearing. When such sleeve springs are used in motor vehicle construction, this leads to the acoustic discomfort in the motor vehicle being impaired to an extent which cannot be ignored.

Proceeding from this state of the art, the technical problem on which the invention is based is to improve a hydraulically damping sleevelike rubber bearing of the type explained above, to the effect that, after a subacoustic damping range, that is to say a frequency range of below approximately 10 Hz and a resonance maximum in the range of 10 to 30 Hz, the sleeve spring has, in the subsequent low acoustic frequency range at least up to a range of approximately 200 Hz, a markedly reduced dynamic bearing spring constant, as compared with the state of the art, in order to suppress the transmission of solidborne sound in this lower acoustic range.

The invention achieves this object in, that a transmission of vibrations of low amplitude through the bearing is brought about not only by throttle losses in a flow of the working fluid in a throttle duct, but essentially also due to the fact that the supporting connection piece and the abutment connection piece of the sleeve bearing are acoustically uncoupled by means of an uncoupling member.

In this case, uncoupling is carried out, in a way known per se for large-volume supporting bearings, via a loose piece which makes it possible to compensate the sound pressure between the fluid chambers of such a supporting bearing, without relevant displacements in the volume of the damping fluid occurring in the throttle duct between the working chamber and compensating chamber. In this case, the loose piece is arranged in a separate subsidiary duct to the throttle duct.

In the sleeve bearing under consideration here, the flutterable loose piece serving as an uncoupling member is arranged in one of the two overflow ducts of the sleeve bearing, that is to say either in the damping duct or, preferably, in the bypass duct. In this case, "Loose piece" means, in the usual sense, an insert part which is inserted or received in a receptacle or cage loosely, that is to say without any positive connection, so as to be limited on all sides, but freely movable within this framework, and flutterable.

If the restraint for the loose piece is designed as a cage, the wall perforations of such an uncoupling cage must have such large dimensions that they allow a throttle-free passage of the solidborne sound waves of low amplitudes which are to be uncoupled in the damping fluid of the sleeve bearing.

However, since, under some circumstances, the use of cages for restraining the loose piece when the bearing is subjected to shocks may not be entirely without its problems, the loose piece inserted in the sleeve bearing of the invention is preferably mounted flutterably in undercut structures (FIG. 3).

The material of the loose piece itself may, in principle, be selected, as desired, from materials of relatively low density, that is to say may, for example, also be a plastic part or an aluminum sheet, but, for the present purpose, is preferably an elastomeric part, in particular an elastomeric web or an elastomeric diaphragm, in order to rule out the occurrence of rattling noises or fluttering noises of the loose piece, in particular in a cage.

According to a preferred embodiment of the invention, the uncoupling member is oriented axially parallel to the longitudinal axis of the sleeve spring and extends preferably over the axial width of the rubber spring body between two end-face sealing means, preferably two cylindrical surface sealing rings of the sleeve cage of the rubber spring. This design makes it possible, if the uncoupling member has only a small overall height in the radial direction of the sleeve spring, nevertheless to provide an effective surface which is sufficiently large for acoustic uncoupling.

If a cylindrical surface seal is used on the two end faces of the sleeve spring, the throttle duct is designed preferably in the radially outer generated surfaces of the cylindrical rings. The two part throttle ducts thus designed are connected communicatingly, again with respect to the sleeve bearing, by means of a duct portion axially connecting the two end-face annular ducts to one another. If the uncoupling member is arranged in the throttle duct, it is then preferably arranged in this axially running connecting portion.

Instead of a decoupling cage with an inserted loose piece, especially an elastomeric diaphragm as a loose piece, other means known per se may also be used for acoustic uncoupling, above all an easily deformable rubber diaphragm or rubber lip which either can be designed in one piece with the rubber spring block or can be fastened or movably secured in another way in the bypass duct or in the throttle duct.

If the hydraulically damping sleevelike rubber bearing is equipped with a bypass duct, the uncoupling of the acoustic vibrations of low amplitudes preferably takes place at or in such a bypass duct, in which case, however, such uncoupling must then be arranged, in functional terms, not in series with the bypass duct valve, but parallel to the latter, in order not to impair the damping fluid stream which, as intended, occurs in this bypass duct under shocks which act on the rubber bearing. Both functionalities, namely permeability to pressure shocks in the damping fluid and the uncoupling of acoustic vibrations with low amplitudes, must be implemented in such a way that they are available in the sleeve bearing independently of one another in functional terms and without impairing one another. Such a functional parallelism of the bypass valve and the uncoupling member does not, however, rule out the possibility of both functions also being implemented in one and the same structural part, since they must respond at limit values of the pressure fluctuations occurring in the damping fluid, these limit values being markedly different in each case.

The rubber sleeve bearing of the invention is preferably used as a radial bearing. It may, however, likewise be employed effectively for use as an axial bearing, specifically, in particular, when such an axial bearing is also exposed to relatively high radial forces during its intended use.

The invention is explained in more detail below with reference to exemplary embodiments, in conjunction with the drawings, in which:

FIG. 1 illustrates, in radial section, a hydraulically damping rubber sleeve spring with an uncoupling element for the uncoupling of low frequency acoustic vibrations.

Figure 1:
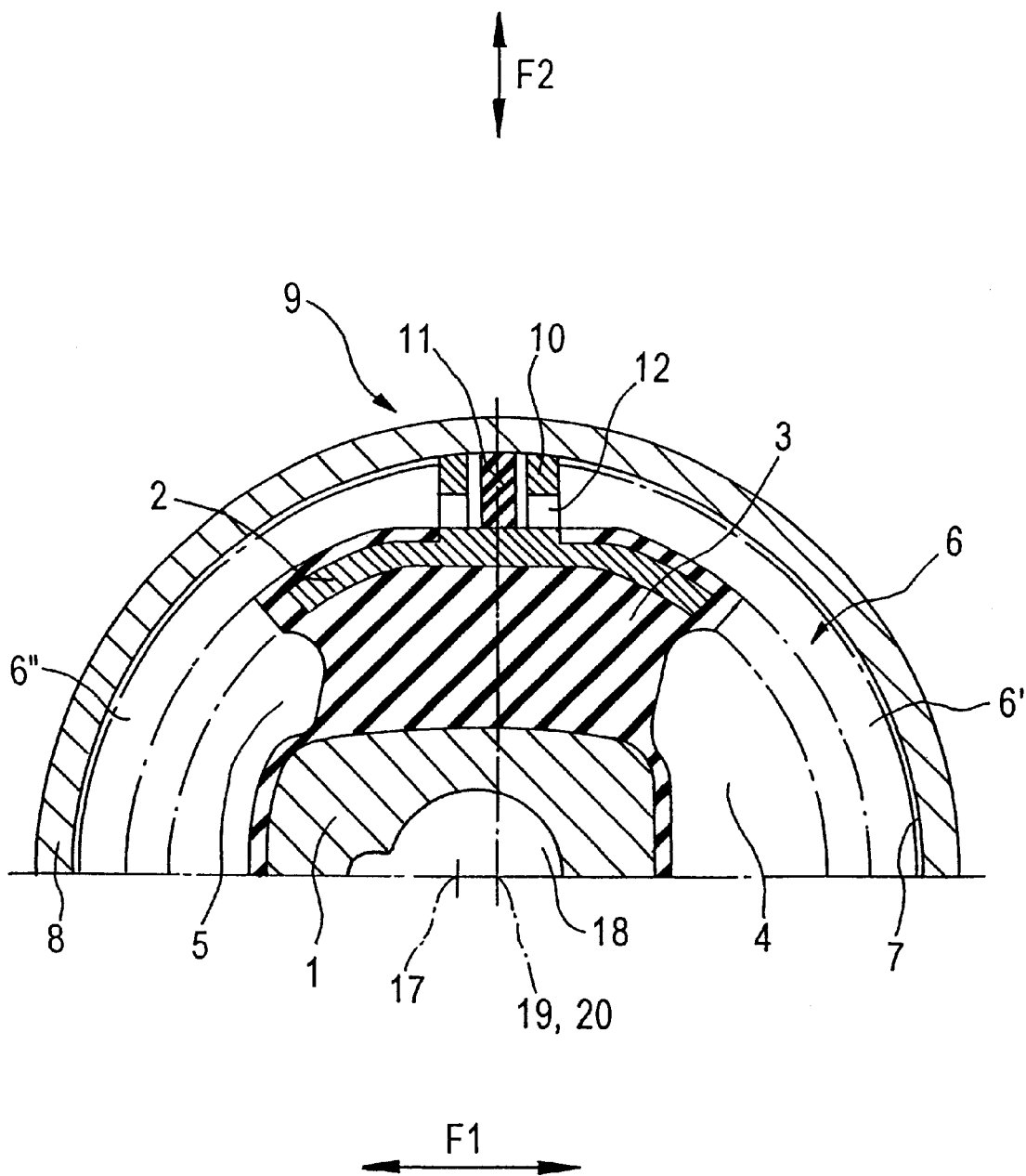
FIG. 1 shows, in radial section, an exemplary embodiment of a hydraulically damping sleevelike radial rubber bearing with an uncoupling member designed as a cage and loose piece.

An inner sleevelike or hublike connecting block 1 is surrounded in an axially parallel manner by a sleevelike cage 2. The inner connecting block 1 and the sleevelike cage 2 are vulcanized into a rubber spring block 3. Two working fluid chambers 4, 5 are designed in the rubber spring block 3 and communicate with one another via the two branches 6', 6" of a throttle duct 6. The working chambers 4, 5 and the throttle duct 6 are closed off in a fluid-tight manner, radially relative to the outside, by means of the cylindrically inner wall 7 of an outer sleeve 8 made of steel. For this purpose, the rubber spring block 3, reinforced by the sleeve cage 2, is pressed under radial prestress into the outer sleeve 8. A bypass duct of larger cross section, which is not illustrated here, is designed radially opposite the throttle duct 6 (in the lower portion of FIG. 1 which is not shown).

The sleeve spring has a softer spring characteristic in the radial working direction, illustrated by the double arrow F1, than in the transverse direction which is oriented perpendicularly to the latter in the radial plane and which is characterized by the double arrow F2.

Inserted in the course of the throttle duct 6, which connects the chambers 4, 5 to one another, is an uncoupling member 9 which consists of an uncoupling cage 10 and of an inserted loose piece 11 in the form of an elastomeric diaphragm. At the same time, the two mutually opposite walls 10 of the uncoupling member 9 extend, axially parallel to the bearing longitudinal axis, over the entire axial length of the working chambers 4, 5 and of the ducts designed axially laterally of the chambers. A series of bores 12 lying closely next to one another is designed in each of the cage walls. Inserted between the two uncoupling chamber walls 10 which form a cage is a self-supporting elastomeric strip 11 which, at most loosely, bears with all its side surfaces on the surrounding wall surfaces of the uncoupling chamber. As is clear from FIG. 1, the thickness of the elastomeric strip is markedly smaller than the clear distance between the two inner wall surfaces of the uncoupling chamber walls 10.

When vibrations of low amplitudes, that is to say vibrations of amplitudes in the range of <±0.1 mm, are introduced into the connecting block 1, they pass as solidborne sound vibrations, via the connecting block 1, into the pressure fluid of the working chambers 4, 5 and run as pressure waves through the working fluid out of the working chambers 4, 5, through connecting apertures not illustrated in FIG. 1, into the throttle part ducts 6', 6" , through these and through the bores 12 to the elastomeric loose piece 11 in the uncoupling member 9. Since the working chambers 4, 5 and the pressure wave paths through the apertures, not illustrated, and via the throttle duct portions 6' and 6" are designed to be essentially symmetric under load, the sound pressure waves impinge, in a way complementary to their generation, onto the elastomeric loose piece in the uncoupling member, where they are canceled, virtually unreflected, without damping processes or flow processes occurring in the throttle duct 6. A bypass duct remains unaffected by this event.

It should be pointed out, in this respect, that a radial rubber sleeve bearing is illustrated in FIG. 1 in the uninstalled unloaded state, in which the longitudinal axis 17 of the bore 18 in the inner connecting block 1 does not run coaxially, but merely axially parallel to the bearing axis 19 and to the longitudinal axis 20 of the sleeve (2). In this case, in the state shown in FIG. 1, before an intended installation of the bearing, the rubber spring body 3 is configured and prestressed in such a way that, under the action of the predetermined static nominal load on the connecting block, from left to right in the direction of the double arrow F1 in the illustration of FIG. 1, the rubber spring 3 is deformed to such an extent that all three axes (17, 19, 20) mentioned then actually coincide coaxially at the zero point of an exerted dynamic load.

Figure 2:
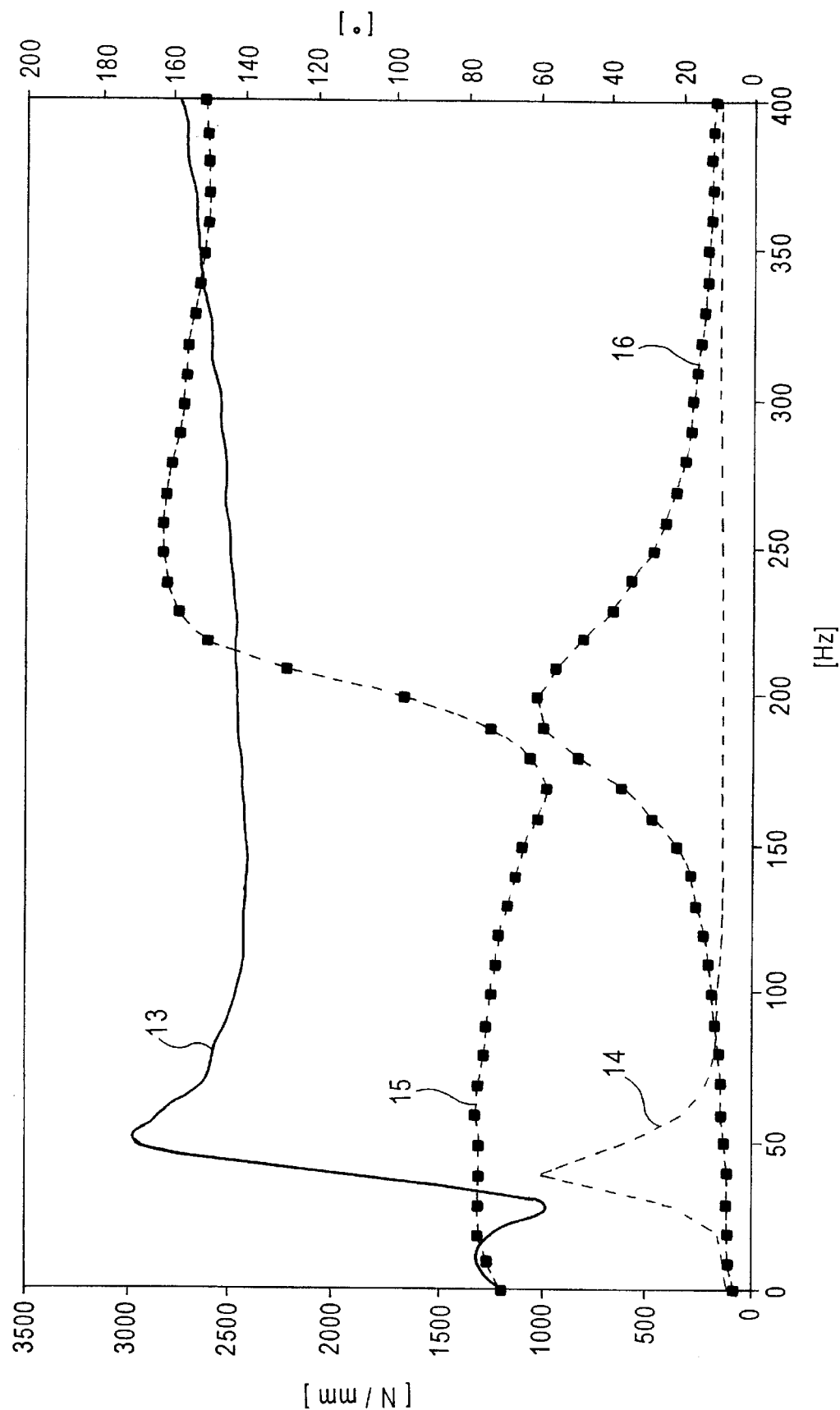
FIG. 2 shows bearing spring characteristics for the exemplary embodiment shown in FIG. 1 and for a comparative bearing according to the state of the art.

The action of the uncoupling member 9 shown in FIG. 1 may be gathered from the sleeve spring bearing characteristics shown in FIG. 2.

The curve 13 shows the profile of the dynamic spring constant as a function of the frequency of a vibration imparted to the connection piece, through the sleeve spring according to the prior art without an uncoupling member. The resonance of the throttle duct, which is in the range around 40 Hz, and the high dynamic rigidity of the sleeve spring according to the prior art, which remains above approximately 40 to 50 Hz, can be seen clearly.

In FIG. 2, the curve 14 shows the associated loss angle, likewise as a function of the load frequency.

The curve 15 of FIG. 2, provided with the measurement points, shows the profile of the dynamic spring constant to the same sleeve spring after the uncoupling member 9, illustrated in FIG. 1, has been installed. The sleeve bearing according to the invention reaches the dynamic spring constant only at a frequency of above 200 Hz, this constant already occurring from 50 Hz for the bearing according to the prior art. Thus, whilst, in bearings according to the prior art, the entire acoustic disturbance vibration range from above approximately 40 to 50 Hz runs as solidborne sound through the bearing from the inner connecting block as far as the outer connection sleeve, in the bearing of the invention it is possible, above all, to uncouple the acoustic disturbance range, in the frequency range of up to 200 Hz, which presents problems in motor vehicle construction.

The frequency profile, belonging to curve the 15 in the graph of FIG. 2, of the loss angle for the sleeve bearing according to the invention is reproduced in the curve 16.

Figure 3:
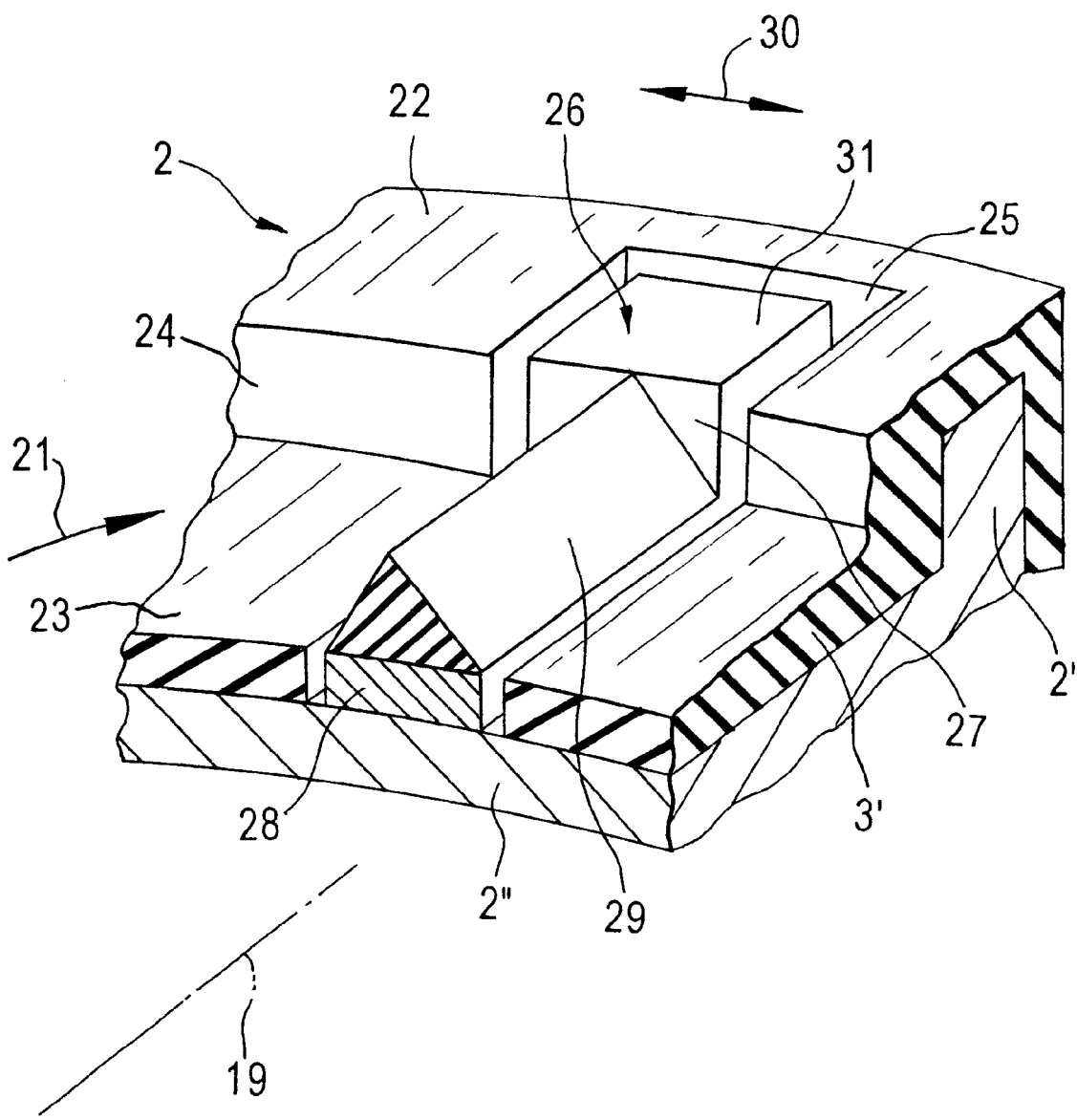
FIG. 3 shows a perspective part illustration of a combined bypass valve/uncoupling member in a bypass duct to a sleeve spring.

FIG. 3 shows a perspective part view, partly in radial section, of a second exemplary embodiment of the invention.

FIG. 3, taken in radial section, shows a portion of a bypass duct (21), which ensures permeability of the sleeve bearing to pressure shocks which may occur in the damping fluid.

The inner cage 2, which consists of steel, has, on the end faces, two cylindrical annular portions 2' which are connected to one another via axially running webs 2" so as to form the cage 2 for the rubber spring 3. As also illustrated here in FIG. 3, the entire surface of the cage 2 is provided, overall, with a highly absorbent and damping rubberizing layer 3' which is produced together with the rubber spring 3 as an integral part of the latter. Otherwise, the sleeve bearing, a detail of which is illustrated in FIG. 3, is, in principle, designed in the same way as the exemplary embodiment shown in FIG. 1, so that details are not illustrated in FIG. 3.

By pushing over the outer steel sleeve 8 (FIG. 1), the ducts and recesses of the sleeve body are closed in a fluid-tight manner. At the same time, the bypass duct 21 reducing the pressure shocks in the damping fluid is closed relative to the outside via the cylindrical surface 22 which, in the way likewise made clear in FIG. 1, forms a cylindrical surface seal relative to the inner wall 7 of the outer sleeve 8 (FIG. 1).

Recesses 25 for receiving an insert part 26 are provided in the cylindrical bottom surface 23 as well as in the annular side wall 24 and in the cylindrical sealing surface 22 of the rubberized bearing spring sleeve 2. The insert part 26 consists of metal or plastic and has a cuboid or parallelepipedic configuration at its ends located axially opposite one another. These two end parallelepipeds 27 located axially opposite one another are connected to one another by means of a flat carrier rail 28.

A weblike sealing lip 29, tapering radially outward, is arranged on the carrier rail 28 of the insert part 26 so as to be fixedly connected to a said carrier rail. The radial height of this sealing lip 29, relative to the sleeve bearing, is dimensioned in such a way that, in the assembled bearing, said sealing lip just avoids touching the inner wall 7 of the outer sleeve 8. The radially outer top edge of the sealing lip 29 leaves a free gap of ≈0.1 mm, with a tolerance of −0.1 mm, relative to the inner wall surface 7 of the outer sleeve 8.

The recess 25 is dimensioned, overall, in such a way that the entire insert part 26 inserted into the recess 25 has all round, but particularly in the tangential direction, a movability which, although limited, is nevertheless sufficient to ensure that it can act in the way described above as a loose piece for acoustic vibration uncoupling. At the same time, as regards the choice of material, this loose piece is held so as to be movable so easily and with such low friction that, when acoustic pressure waves impinge on to its surfaces located transversely opposite one another in the bypass duct, it can flutter in an acoustically uncoupling manner in the way indicated by the double arrow 30 in FIG. 3.

At the same time, the two radially outwardly pointing surfaces 31 of the parallelepipedic end parts 27 of the insert part 26, said surfaces being located axially opposite one another on the cage web 28, are dimensioned, in their radial vertical position, with such undersize in relation to the inner surface 7 of the outer sleeve 8 (FIG. 1) that, under comparatively high pressure shocks in the damping fluid of the bearing which act on the web 29, said surfaces can be tilted sufficiently far to be capable of acting as a bypass valve body and of opening, that is to say to be permeable to shock waves and high amplitudes.

The insert part 26 arranged transversely in the bypass duct 21 thus performs both the function of a loose piece for the uncoupling of acoustic vibrations and the function of a valve body for the permeability of the sleeve bearing to high amplitudes and shock fronts.

By virtue of their characteristic data, in conjunction with their small overall size, the sleevelike radial rubber bearings according to the invention are used preferably in motor vehicle construction as a chassis bush, in particular for reducing transverse axle vibrations on the cross struts of the vehicle front axles.

What is claimed is:

1. A hydraulically damping sleeve bearing, comprising:
    an outer sleeve;
    an intermediate cage surrounded by said outer sleeve;
    an inner connecting block surrounded by said intermediate cage, said inner block and intermediate cage being embedded in an elastomer spring body;
    said spring body being shaped to form, together with an inner wall of said outer sleeve, at least two working chambers communicating with each other via at least one damping throttle duct and at least one bypass duct, said throttle and bypass ducts having different dynamic characteristics and being tuned to different frequency and amplitude ranges;
    said working chambers, and said throttle and bypass ducts being filled with a damping fluid sealed off in a fluid-tight manner;
    said bypass duct including a decoupling member for decoupling said damping fluid between said working chambers in response to low amplitude vibrations, and a pressure relief valve for opening said bypass duct in response to high amplitude vibrations and pressure fronts occurring in said damping fluid, wherein said decoupling member and pressure relief valve are integrated into a single functional unit formed as a loose piece without any positive connection.

2. The hydraulically damping sleeve bearing according to claim 1, wherein said inner block and intermediate cage are positioned coaxially in a working direction of said sleeve bearing, while said functional unit extends diametrically, substantially perpendicularly with said working direction.

3. A hydraulically damping sleeve bearing, comprising:

an outer sleeve;

an intermediate cage surrounded by said outer sleeve;

an inner connecting block surrounded by said intermediate cage, said inner block and intermediate cage being embedded in an elastomer spring body;

said spring body being shaped to form, together with an inner wall of said outer sleeve, at least two working chambers communicating with each other via at least one damping throttle duct and at least one bypass duct, said throttle and bypass ducts having different dynamic characteristics and being tuned to different frequency and amplitude ranges;

said working chambers, and said throttle and bypass ducts being filled with a damping fluid sealed off in a fluid-tight manner;

said bypass duct including a decoupling member for decoupling said damping fluid between said working chambers in response to low amplitude vibrations, and a pressure relief valve for opening said bypass duct in response to high amplitude vibrations and pressure fronts occurring in said damping fluid, wherein said decoupling member and pressure relief valve are integrated into a single functional unit;

wherein said functional unit comprises a tiltable tip valve mounted as a loose piece, across said bypass duct so that said tip valve is displaceable along said bypass duct in a flutterable manner under said low amplitude vibrations, and tiltable sufficiently far to open said bypass duct under said high amplitude vibrations or pressure fronts.

4. The hydraulically damping sleeve bearing according to claim 3, wherein said functional unit further comprises at least an insert part fixedly connected with said lip valve and loosely held in a recess formed in a wall of said bypass duct; a clearance between said insert part and said recess is made so that said insert part is displaceable along said bypass duct in a flutterable manner under said low amplitude vibrations, and tiltable sufficiently far under said high amplitude vibrations or pressure fronts.

5. The hydraulically damping sleeve bearing according to claim 3, wherein a cross section of said bypass duct is larger than a cross section of said throttle duct.

6. A chassis bush of a motor vehicle using a hydraulically damping sleeve bearing, said sleeve bearing comprising:

an outer sleeve;

an intermediate cage surrounded by said outer sleeve;

an inner connecting block surrounded by said intermediate cage, said inner block and intermediate cage being embedded in an elastomer spring body;

said spring body being shaped to form, together with an inner wall of said outer sleeve, at least two working chambers communicating with each other via at least one damping throttle duct and at least one bypass duct, said throttle and bypass ducts having different dynamic characteristics and being tuned to different frequency and amplitude ranges;

said working chambers, and said throttle and bypass ducts being filled with a damping fluid sealed off in a fluid-tight maimer;

said bypass duct including a decoupling member for decoupling said damping fluid between said working chambers in response to low amplitude vibrations, and a pressure relief valve for opening said bypass duct in response to high amplitude vibrations and pressure fronts occurring in said damping fluid, wherein said decoupling member and pressure relief valve are integrated into a single functional unit formed as a loose piece without any positive connection.

\* \* \* \* \*